US011772491B2

(12) United States Patent
Lesuffleur et al.

(10) Patent No.: US 11,772,491 B2
(45) Date of Patent: Oct. 3, 2023

(54) LIGHT GUIDE-BASED DEADFRONT FOR DISPLAY, RELATED METHODS AND VEHICLE INTERIOR SYSTEMS

(71) Applicant: CORNING INCORPORATED, Corning, NY (US)

(72) Inventors: Antoine D. Lesuffleur, Fontainebleau (FR); Xiang-Dong Mi, Pittsford, NY (US); Xu Ouyang, Painted Post, NY (US); Yawei Sun, Elmira, NY (US)

(73) Assignee: Corning Incorporated, Corning, NY (US)

( * ) Notice: Subject to any disclaimer, the term of this patent is extended or adjusted under 35 U.S.C. 154(b) by 629 days.

(21) Appl. No.: 16/646,756

(22) PCT Filed: Sep. 12, 2018

(86) PCT No.: PCT/US2018/050562
§ 371 (c)(1),
(2) Date: Mar. 12, 2020

(87) PCT Pub. No.: WO2019/055453
PCT Pub. Date: Mar. 21, 2019

(65) Prior Publication Data
US 2020/0207207 A1 Jul. 2, 2020

Related U.S. Application Data

(60) Provisional application No. 62/557,987, filed on Sep. 13, 2017.

(51) Int. Cl.
*G02B 1/14* (2015.01)
*B60K 37/02* (2006.01)
(Continued)

(52) U.S. Cl.
CPC .............. *B60K 37/02* (2013.01); *G02B 1/14* (2015.01); *G06F 1/1609* (2013.01);
(Continued)

(58) Field of Classification Search
CPC .............. B60K 37/02; B60K 2370/688; B60K 2370/98; B60K 2370/336;
(Continued)

(56) References Cited

U.S. PATENT DOCUMENTS 2,068,030 A 1/1937 Lieser
2,608,030 A 8/1952 Jendrisak
(Continued)

FOREIGN PATENT DOCUMENTS

CN 1587132 A 3/2005
CN 1860081 A 11/2006
(Continued)

OTHER PUBLICATIONS

"Stainless Steel—Grade 410 (UNS S41000)", available online at <https://www.azom.com/article.aspx?ArticleID=970>, Oct. 23, 2001, 5 pages.
(Continued)

*Primary Examiner* — Andrew J Coughlin
*Assistant Examiner* — Hana S Featherly

(57) ABSTRACT

Embodiments of a deadfront article for a display are disclosed herein. The deadfront article includes a cover structure having: an inner surface; an outer surface opposite the inner surface; a glass layer located between the inner surface and the outer surface; and a first layer of light transmitting ink or pigment located between the inner surface of the cover structure and the glass layer. The deadfront article also includes a light guide layer having: an inner surface; and an outer surface facing toward the inner surface of the cover structure. A light extraction layer located on at least one of
(Continued)

the inner surface and the outer surface of the light guide layer.

19 Claims, 5 Drawing Sheets

(51) Int. Cl.
    *G06F 1/16*                (2006.01)
    *G09F 21/04*             (2006.01)

(52) U.S. Cl.
    CPC .. *B60K 2370/1523* (2019.05); *B60K 2370/28* (2019.05); *B60K 2370/336* (2019.05); *B60K 2370/688* (2019.05); *B60K 2370/98* (2019.05); *G09F 21/049* (2020.05)

(58) Field of Classification Search
    CPC ........ B60K 2370/1523; B60K 2370/28; G02B 1/14; G06F 1/1609; G09F 21/049
    USPC .................................................. 362/488, 509
    See application file for complete search history.

(56) References Cited

U.S. PATENT DOCUMENTS

| | | | |
|---|---|---|---|
| 3,197,903 | A | 8/1965 | Walley |
| 3,338,696 | A | 8/1967 | Dockerty |
| 3,582,456 | A | 6/1971 | Stolki |
| 3,682,609 | A | 8/1972 | Dockerty |
| 3,753,840 | A | 8/1973 | Plumat |
| 3,778,335 | A | 12/1973 | Boyd |
| 3,790,430 | A | 2/1974 | Mochel |
| 3,799,817 | A | 3/1974 | Laethem |
| 4,147,527 | A | 4/1979 | Bystrov et al. |
| 4,238,265 | A | 12/1980 | Deminet |
| 4,445,953 | A | 5/1984 | Hawk |
| 4,455,338 | A | 6/1984 | Henne |
| 4,859,636 | A | 8/1989 | Aratani et al. |
| 4,899,507 | A | 2/1990 | Mairlot |
| 4,969,966 | A | 11/1990 | Norman |
| 4,985,099 | A | 1/1991 | Mertens et al. |
| 5,108,480 | A | 4/1992 | Sugiyama |
| 5,154,117 | A | 10/1992 | Didelot et al. |
| 5,173,102 | A | 12/1992 | Weber et al. |
| 5,245,468 | A | 9/1993 | Demiryont et al. |
| 5,250,146 | A | 10/1993 | Horvath |
| 5,264,058 | A | 11/1993 | Hoagland et al. |
| 5,300,184 | A | 4/1994 | Masunaga |
| 5,711,119 | A | 1/1998 | Cornils et al. |
| 5,897,937 | A | 4/1999 | Cornils et al. |
| 6,044,662 | A | 4/2000 | Morin |
| 6,086,983 | A | 7/2000 | Yoshizawa |
| 6,101,748 | A | 8/2000 | Cass et al. |
| 6,242,931 | B1 | 6/2001 | Hembree et al. |
| 6,265,054 | B1 | 7/2001 | Bravet et al. |
| 6,270,605 | B1 | 8/2001 | Doerfler |
| 6,274,219 | B1 | 8/2001 | Schuster et al. |
| 6,287,674 | B1 | 9/2001 | Verlinden et al. |
| 6,302,985 | B1 | 10/2001 | Takahashi et al. |
| 6,332,690 | B1 | 12/2001 | Murofushi |
| 6,387,515 | B1 | 5/2002 | Joret et al. |
| 6,420,800 | B1 | 7/2002 | Levesque et al. |
| 6,426,138 | B1 | 7/2002 | Narushima et al. |
| 6,582,799 | B1 | 6/2003 | Brown et al. |
| 6,620,365 | B1 | 9/2003 | Odoi et al. |
| 6,816,225 | B2 | 11/2004 | Colgan et al. |
| 6,903,871 | B2 | 6/2005 | Page |
| 7,297,040 | B2 | 11/2007 | Chang et al. |
| 7,375,782 | B2 | 5/2008 | Yamazaki et al. |
| 7,478,930 | B2 | 1/2009 | Choi |
| 7,489,303 | B1 | 2/2009 | Pryor |
| 7,542,302 | B1 | 6/2009 | Curnalia et al. |
| 7,750,821 | B1 | 7/2010 | Taborisskiy et al. |
| 7,955,470 | B2 | 6/2011 | Kapp et al. |
| 8,298,431 | B2 | 10/2012 | Chwu et al. |
| 8,344,369 | B2 | 1/2013 | Yamazaki et al. |
| 8,521,955 | B2 | 8/2013 | Arulambalam et al. |
| 8,549,885 | B2 | 10/2013 | Dannoux et al. |
| 8,586,492 | B2 | 11/2013 | Barefoot et al. |
| 8,652,978 | B2 | 2/2014 | Dejneka et al. |
| 8,692,787 | B2 | 4/2014 | Imazeki |
| 8,702,253 | B2 | 4/2014 | Lu et al. |
| 8,765,262 | B2 | 7/2014 | Gross |
| 8,814,372 | B2 | 8/2014 | Vandal et al. |
| 8,833,106 | B2 | 9/2014 | Dannoux et al. |
| 8,912,447 | B2 | 12/2014 | Leong et al. |
| 8,923,693 | B2 | 12/2014 | Yeates |
| 8,962,084 | B2 | 2/2015 | Brackley et al. |
| 8,967,834 | B2 | 3/2015 | Timmerman et al. |
| 8,969,226 | B2 | 3/2015 | Dejneka et al. |
| 8,978,418 | B2 | 3/2015 | Balduin et al. |
| 9,007,226 | B2 | 4/2015 | Chang |
| 9,061,934 | B2 | 6/2015 | Bisson et al. |
| 9,090,501 | B2 | 7/2015 | Okahata et al. |
| 9,109,881 | B2 | 8/2015 | Roussev et al. |
| 9,140,543 | B1 | 9/2015 | Allan et al. |
| 9,156,724 | B2 | 10/2015 | Gross |
| 9,223,162 | B2 | 12/2015 | Deforest et al. |
| 9,240,437 | B2 | 1/2016 | Shieh et al. |
| 9,278,500 | B2 | 3/2016 | Filipp |
| 9,278,655 | B2 | 3/2016 | Jones et al. |
| 9,290,413 | B2 | 3/2016 | Dejneka et al. |
| 9,346,703 | B2 | 5/2016 | Bookbinder et al. |
| 9,346,706 | B2 | 5/2016 | Bazemore et al. |
| 9,357,638 | B2 | 5/2016 | Lee et al. |
| 9,442,028 | B2 | 9/2016 | Roussev et al. |
| 9,446,723 | B2 | 9/2016 | Stepanski |
| 9,469,561 | B2 | 10/2016 | Kladias et al. |
| 9,517,967 | B2 | 12/2016 | Dejneka et al. |
| 9,573,843 | B2 | 2/2017 | Keegan et al. |
| 9,593,042 | B2 | 3/2017 | Hu et al. |
| 9,595,960 | B2 | 3/2017 | Wilford |
| 9,606,625 | B2 | 3/2017 | Levesque et al. |
| 9,617,180 | B2 | 4/2017 | Bookbinder et al. |
| 9,663,396 | B2 | 5/2017 | Miyasaka et al. |
| 9,694,570 | B2 | 7/2017 | Levasseur et al. |
| 9,700,985 | B2 | 7/2017 | Kashima et al. |
| 9,701,564 | B2 | 7/2017 | Bookbinder et al. |
| 9,720,450 | B2 | 8/2017 | Choi et al. |
| 9,724,727 | B2 | 8/2017 | Domey et al. |
| 9,802,485 | B2 | 10/2017 | Masuda et al. |
| 9,815,730 | B2 | 11/2017 | Marjanovic et al. |
| 9,821,509 | B2 | 11/2017 | Kastell |
| 9,895,975 | B2 | 2/2018 | Lee et al. |
| 9,902,640 | B2 | 2/2018 | Dannoux et al. |
| 9,931,817 | B2 | 4/2018 | Rickerl |
| 9,933,820 | B2 | 4/2018 | Helot et al. |
| 9,947,882 | B2 | 4/2018 | Zhang et al. |
| 9,955,602 | B2 | 4/2018 | Wildner et al. |
| 9,957,190 | B2 | 5/2018 | Finkeldey et al. |
| 9,963,374 | B2 | 5/2018 | Jouanno et al. |
| 9,972,645 | B2 | 5/2018 | Kim |
| 9,975,801 | B2 | 5/2018 | Maschmeyer et al. |
| 9,992,888 | B2 | 6/2018 | Moon et al. |
| 10,005,246 | B2 | 6/2018 | Stepanski |
| 10,017,033 | B2 | 7/2018 | Fisher et al. |
| 10,042,391 | B2 | 8/2018 | Yun et al. |
| 10,074,824 | B2 | 9/2018 | Han et al. |
| 10,086,762 | B2 | 10/2018 | Uhm |
| 10,131,118 | B2 | 11/2018 | Kang et al. |
| 10,140,018 | B2 | 11/2018 | Kim et al. |
| 10,153,337 | B2 | 12/2018 | Lee et al. |
| 10,175,802 | B2 | 1/2019 | Boggs et al. |
| 10,211,416 | B2 | 2/2019 | Jin et al. |
| 10,222,825 | B2 | 3/2019 | Wang et al. |
| 10,273,184 | B2 | 4/2019 | Garner et al. |
| 10,303,223 | B2 | 5/2019 | Park et al. |
| 10,303,315 | B2 | 5/2019 | Jeong et al. |
| 10,326,101 | B2 | 6/2019 | Oh et al. |
| 10,328,865 | B2 | 6/2019 | Jung |
| 10,343,377 | B2 | 7/2019 | Levasseur et al. |
| 10,347,700 | B2 | 7/2019 | Yang et al. |
| 10,377,656 | B2 | 8/2019 | Dannoux et al. |

(56) References Cited

U.S. PATENT DOCUMENTS

| | | |
|---|---|---|
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |
| 10,606,395 B2 | 3/2020 | Boggs et al. |
| 10,649,267 B2 | 5/2020 | Tuan et al. |
| 10,788,707 B2 | 9/2020 | Ai et al. |
| 10,976,607 B2 | 4/2021 | Huang et al. |
| 2002/0039229 A1 | 4/2002 | Hirose et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Barton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0096937 A1 | 4/2009 | Bauer et al. |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0164860 A1* | 7/2010 | Misono ............... G02B 6/0038 345/102 |
| 2010/0182143 A1 | 7/2010 | Lynam |
| 2010/0245253 A1 | 9/2010 | Rhyu et al. |
| 2011/0057465 A1 | 3/2011 | Beau et al. |
| 2011/0148267 A1 | 6/2011 | McDaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1 | 8/2014 | Immerman et al. |
| 2014/0308464 A1 | 10/2014 | Levasseur et al. |
| 2014/0312518 A1 | 10/2014 | Levasseur et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0023830 A1 | 1/2017 | Yang et al. |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0090247 A1 | 3/2017 | Lee et al. |
| 2017/0094039 A1 | 3/2017 | Lu |
| 2017/0115518 A1* | 4/2017 | Shin ................... H01L 27/1248 |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | McFarland |
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0334770 A1 | 11/2017 | Luzzato et al. |
| 2017/0349473 A1 | 12/2017 | Moriya et al. |
| 2018/0009197 A1 | 1/2018 | Gross et al. |
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0069053 A1 | 3/2018 | Bok |

(56) References Cited

U.S. PATENT DOCUMENTS

| | | |
|---|---|---|
| 2018/0072022 A1 | 3/2018 | Tsai et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Helot |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0245125 A1 | 8/2018 | Tsai et al. |
| 2018/0304825 A1 | 10/2018 | Mattelet et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |
| 2019/0039935 A1 | 2/2019 | Couillard et al. |
| 2019/0069451 A1 | 2/2019 | Myers et al. |
| 2019/0077337 A1 | 3/2019 | Gervelmeyer |
| 2019/0152831 A1 | 5/2019 | An et al. |
| 2019/0223309 A1 | 7/2019 | Amin et al. |
| 2019/0295494 A1 | 9/2019 | Wang et al. |
| 2019/0315648 A1 | 10/2019 | Kumar et al. |
| 2019/0329531 A1 | 10/2019 | Brennan et al. |
| 2020/0064535 A1 | 2/2020 | Haan et al. |
| 2020/0301192 A1 | 9/2020 | Huang et al. |
| 2021/0055599 A1 | 2/2021 | Chen et al. |

FOREIGN PATENT DOCUMENTS

| | | |
|---|---|---|
| CN | 101600846 A | 12/2009 |
| CN | 101684032 A | 3/2010 |
| CN | 201989544 U | 9/2011 |
| CN | 102341356 A | 2/2012 |
| CN | 102464456 A | 5/2012 |
| CN | 103136490 A | 6/2013 |
| CN | 103587161 A | 2/2014 |
| CN | 203825589 U | 9/2014 |
| CN | 204111583 U | 1/2015 |
| CN | 102566841 B | 4/2015 |
| CN | 104656999 A | 5/2015 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3426614 A1 | 1/2019 |
| EP | 3532442 A1 | 9/2019 |
| FR | 2750075 A1 | 12/1997 |
| FR | 2918411 B1 | 10/2013 |
| FR | 3012073 A1 | 4/2015 |
| GB | 0805770 A | 12/1958 |
| GB | 0991867 A | 5/1965 |
| GB | 1319846 A | 6/1973 |
| GB | 2011316 A | 7/1979 |
| GB | 2281542 A | 3/1995 |
| JP | 55-154329 | 12/1980 |
| JP | 57-048082 A | 3/1982 |
| JP | 58-073681 A | 5/1983 |
| JP | 58-194751 | 11/1983 |
| JP | 59-076561 A | 5/1984 |
| JP | 63-089317 A | 4/1988 |
| JP | 63-190730 | 8/1988 |
| JP | 3059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |
| JP | 11-001349 A | 1/1999 |
| JP | 11-006029 A | 1/1999 |
| JP | 11-060293 A | 3/1999 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2007-188035 A | 7/2007 |
| JP | 2007-197288 A | 8/2007 |
| JP | 2010-145731 A | 7/2010 |
| JP | 2012-111661 A | 6/2012 |
| JP | 2013-084269 A | 5/2013 |
| JP | 2014-126564 A | 7/2014 |
| JP | 2015-502901 A | 1/2015 |
| JP | 2015092422 A | 5/2015 |
| JP | 5748082 B2 | 7/2015 |
| JP | 5796561 B2 | 10/2015 |
| JP | 2016-500458 A | 1/2016 |
| JP | 2016031696 A | 3/2016 |
| JP | 2016-517380 A | 6/2016 |
| JP | 2016-130810 A | 7/2016 |
| JP | 2016-144008 A | 8/2016 |
| JP | 05976561 B2 | 8/2016 |

(56) References Cited

FOREIGN PATENT DOCUMENTS

| | | |
|---|---|---|
| JP | 2016-530204 A | 9/2016 |
| JP | 2016173794 A | 9/2016 |
| JP | 2016-207200 A | 12/2016 |
| JP | 2016203609 A | 12/2016 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201438895 A | 10/2014 |
| TW | 201546006 A | 12/2015 |
| TW | 201636309 A | 10/2016 |
| TW | 201637857 A | 11/2016 |
| TW | 201730645 A | 9/2017 |
| VN | 58334 | 7/2018 |
| WO | 94/25272 A1 | 11/1994 |
| WO | 97/39074 A1 | 10/1997 |
| WO | 9801649 A1 | 1/1998 |
| WO | 00/73062 A1 | 12/2000 |
| WO | 2006/095005 A1 | 9/2006 |
| WO | 2007108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/202605 A1 | 12/2016 |
| WO | 2016196531 A1 | 12/2016 |
| WO | 2016196546 A1 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/158031 A1 | 9/2017 |
| WO | 2017155932 A1 | 9/2017 |
| WO | 2018/015392 A1 | 1/2018 |
| WO | 2018005646 A1 | 1/2018 |
| WO | 2018009504 A1 | 1/2018 |
| WO | 2018075853 A1 | 4/2018 |
| WO | 2018081068 A1 | 5/2018 |
| WO | 2018/102332 A1 | 6/2018 |
| WO | 2018125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

"Standard Test Method for Measurement of Glass Stress—Optical Coefficient", ASTM International, Designation: C770-16, 2016.

Ashley Klamer, "Dead front overlays", Marking Systems, Inc., Jul. 8, 2013, 2 pages.

ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.

ASTM C1422/C1422M-10 "Standard Specification for Chemically Strengthened Flat Glass"; Downloaded Jan. 24, 2018; 5 pages.

ASTM Standard C770-98 (2013), "Standard Test Method for Measurement of Glass Stress-Optical Coefficient".

Burchardt et al., (Editorial Team), Elastic Bonding: The basic principles of adhesive technology and a guide to its cost-effective use in industry, 2006, 71 pages.

Byun et al; "A Novel Route for Thinning of LCD Glass Substrates"; SID 06 Digest; pp. 1786-1788, v37, 2006.

Datsiou et al., "Behaviour of cold bent glass plates during the shaping process", Engineered Transparency. International Conference atglasstec, Dusseldorf, Germany, Oct. 21 and 22, 2014, 9 pages.

Engineering ToolBox, "Coefficients of Linear Thermal Expansion", available online at <https://www.engineeringtoolbox.com/linear-expansion-coefficients-d_95.html>, 2003, 9 pages.

Fauercia "Intuitive HMI for a Smart Life on Board" (2018); 8 Pages http://www.faurecia.com/en/innovation/smart-life-board/intuitive-HMI.

Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].

Ferwerda et al., "Perception of sparkle in anti-glare display screens", Journal of the SID, vol. 22, Issue 2, 2014, pp. 129-136.

Galuppi et al; "Buckling Phenomena in Double Curved Cold-Bent Glass;" Intl. J. Non-Linear Mechanics 64 (2014) pp. 70-84.

Galuppi et al; "Large Deformations and Snap-Through Instability of Cold-Bent Glass" Challenging Glass 4 & Cost Action TU0905 Final Conference; (2014) pp. 681-689.

Galuppi L et al: "Optimal cold bending of laminated glass", Jan. 1, 2007 vol. 52, No. 1/2 Jan. 1, 2007 (Jan. 1, 2007), pp. 123-146.

Gollier et al., "Display Sparkle Measurement and Human Response", SID Symposium Digest of Technical Papers, vol. 44, Issue 1, 2013, pp. 295-297.

(56) References Cited

OTHER PUBLICATIONS

Indian Patent Application No. 201917031293 Office Action dated May 24, 2021; 6 pages; Indian Patent Office.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Li et al., "Effective Surface Treatment on the Cover Glass for Autointerior Applications", SID Symposium Digest of Technical Papers, vol. 47, 2016, pp. 467-469.
Pambianchi et al; "Corning Incorporated: Designing a New Future With Glass and Optics" Chapter 1 In "Materials Research for Manufacturing: an Industrial Perspective of Turning Materials Into New Products"; Springer Series Material Science 224, p. 12 (2016).
Pegatron Corp. "Pegaton Navigate the Future"; Ecockpit/Center Cnsole Work Premiere; Automotive World; Downloaded Jul. 12, 2017; 2 Pages.
Photodon, "Screen Protectors for Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).
Product Information Sheet: Corning® Gorilla® Glass 3 with Native Damage Resistance™, Corning Incorporated, 2015, Rev: F_090315, 2 pages.
Scholze, H., "Glass-Water Interactions", Journal of Non-Crystalline Solids vol. 102, Issues 1-3, Jun. 1, 1988, pp. 1-10.
Stattler; "New Wave-Curved Glass Shapes Design"; Glass Magazine; (2013); 2 Pages.
Stiles Custom Metal, Inc., Installation Recommendations, 2010 https://stilesdoors.com/techdata/pdf/Installation%20Recommendations%20HM%20Windows,%20Transoms%20&%>OSidelites%200710.pdf) (Year: 2010).
Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Zhixin Wang, Polydimethylsiloxane mechanical properties measured by macroscopic compression and nanoindentation techniques, Graduate Theses and Dissertations, University of South Florida, 2011, 79 pages.
International Search Report and Written Opinion of the International Searching Authority; PCT/US2018/050562; dated Jan. 8, 2019; 12 Pages; European Patent Office.
Author Unknown; "Stress Optics Laboratory Practice Guide" 2012; 11 Pages.
Belis et al; "Cold Bending of Laminated Glass Panels"; Heron vol. 52 (2007) No. 1/2; 24 Pages.
Doyle et al; "Manual on Experimental Stress Analysis"; Fifth Edition, Society for Experimental Mechanics; Unknown Year; 31 Pages.
Elziere; "Laminated Glass: Dynamic Rupture of Adhesion"; Polymers; Universite Pierre Et Marie Curie—Paris VI, 2016. English; 181 Pages.
Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.
Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.
Fildhuth et al.; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.
Fildhuth et al.; "Recovery Behaviour of Laminated Cold Bent Glass—Numerical Analysis and Testing"; Challenging Glass 4 & Cost Action TU0905 Final Conference—Louter, Bos & Beus (eds) (2014); 9 Pages.
Fildhuth; "Design and Monitoring of Cold Bent Lamination—Stabilised Glass"; ITKE 39 (2015) 270 Pages.
Galuppi et al; "Cold-Lamination-Bending of Glass: Sinusoidal is Better Than Circular", Composites Part B 79 (2015) 285-300.
Galuppi et al; "Optical Cold Bending of Laminated Glass"; Internaitonal Journal of Solids and Structures, 67-68 (2015) pp. 231-243.
Millard; "Bending Glass in the Parametric Age"; ENCLOS; (2015); pp. 1-6 http://www.enclos.com/site-info/news/bending-glass-in-the-parametric-age.
Neugebauer et al; "Let Thin Glass in the Faade Move Thin Glass-New Possibilities for Glass in the Faade", Conference Paper Jun. 2018; 12 Pages.
Vakar et al; "Cold Bendable, Laminated Glass—New Possibilities in Design"; Structural Engineering International, Feb. 2004 pp. 95-97.
Weijde; "Graduation Plan"; Jan. 2017; 30 Pages.
Werner; "Display Materials and Processes," Information Display; May 2015; 8 Pages.
Taiwanese Patent Application No. 107131827, Office Action dated Oct. 4, 2022, 2 pages (English translation only), Taiwanese Patent Office.

\* cited by examiner

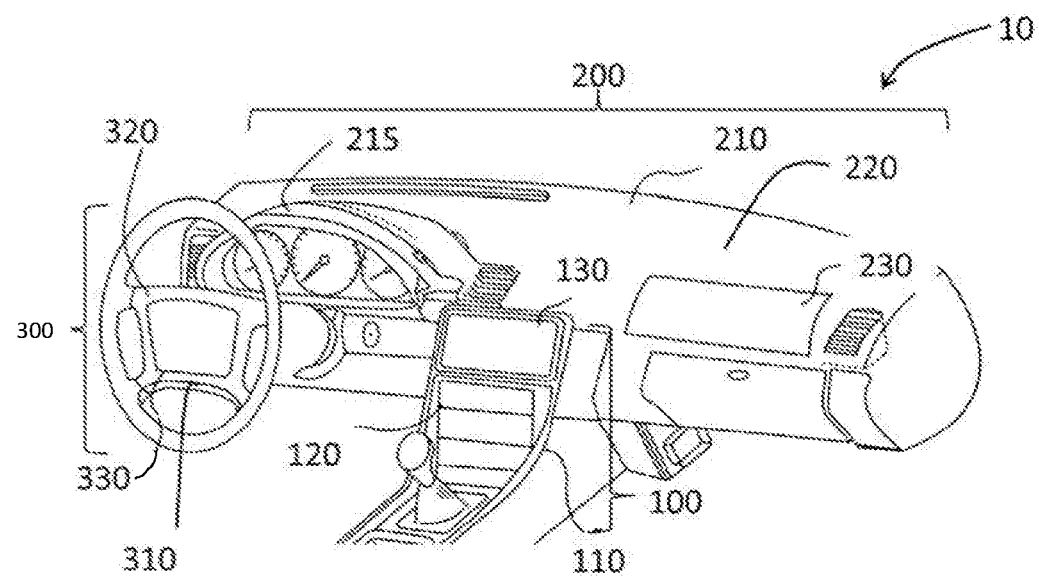
FIG. 1
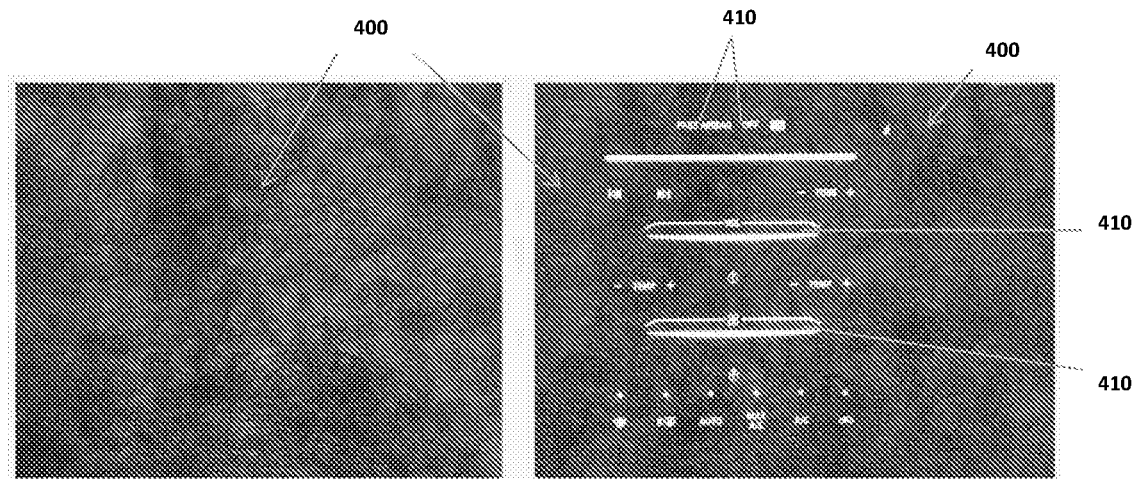
FIG. 2
FIG. 3

LIGHT GUIDE-BASED DEADFRONT FOR DISPLAY, RELATED METHODS AND VEHICLE INTERIOR SYSTEMS

CROSS-REFERENCE TO RELATED APPLICATIONS

This application is a 371 of PCT Application No.: PCT/US2018/050562 filed on Sep. 12, 2018, which claims the benefit of priority under 35 U.S.C. § 119 of U.S. Provisional Application Ser. No. 62/557,987 filed on Sep. 13, 2017, the content of which is relied upon and incorporated herein by reference in its entirety.

TECHNICAL FIELD

The disclosure relates to a light guide-based deadfront article for a display, and more particularly to vehicle interior systems including a light guide-based deadfront article for a display and methods for forming the same.

BACKGROUND

In various applications involving displays, it is desirable to have a display surface or functional surface having a deadfront appearance. In general, a deadfront appearance is a way of hiding a display or functional surface such that there is a seamless transition between a display and a non-display area, or between the deadfronted area of an article and non-deadfronted area or other surface. For example, in a typical display having a glass or plastic cover surface, it is possible to see the edge of the display (or the transition from display area to non-display area) even when the display is turned off. However, it is often desirable from an aesthetic or design standpoint to have a deadfronted appearance such that, when the display is off, the display and non-display areas present as indistinguishable from each other and the cover surface presents a unified appearance. One application where a deadfront appearance is desirable is in automotive interiors, including in-vehicle displays or touch interfaces, as well as other applications in consumer mobile or home electronics, including mobile devices and home appliances. However, it is difficult to achieve both a good deadfront appearance and, when a display is on, a high-quality display.

SUMMARY

One embodiment of the disclosure relates to a deadfront article for a display. The deadfront article includes a cover structure. The cover structure includes an inner surface, an outer surface opposite the inner surface, a glass layer located between the inner surface and the outer surface and a first layer of light transmitting ink or pigment located between the inner surface of the cover structure and the glass layer. The deadfront article includes a light guide layer that includes an inner surface and an outer surface facing toward the inner surface of the cover structure. The deadfront article includes a light extraction layer located on at least one of the inner surfaces and the outer surface of the light guide layer.

Another embodiment of the disclosure relates to a vehicle interior system. The vehicle interior system includes a cover glass layer, a glass light guide layer located below the cover glass layer and a light extraction layer located on a surface of the glass light guide layer. The light extraction layer forms a pattern corresponding to a display graphic. The vehicle interior system includes a first light source optically coupled to the glass light guide layer such that light from the first light source is carried within the glass light guide layer via total internal reflection. When the first light source is activated, the light within the glass light guide layer is extracted out by the light extraction layer in the shape of the display graphic which is visible through the cover glass layer.

Another embodiment of the disclosure relates to a method of forming a curved deadfront for a display. The method includes supporting a deadfront article on a support having a curved surface. The deadfront article includes a cover glass layer, a light guide layer located below the cover glass layer and a light extraction layer located on a surface of the light guide layer. The light extraction layer forms a pattern corresponding to a display graphic. The method includes applying a force to the deadfront article while supported by the support causing the deadfront article to bend such that the deadfront article conforms to the curved shape of the curved surface of the support. During application of the force, a maximum temperature of the deadfront article is less than a glass transition temperature of the cover glass layer.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a perspective view of a vehicle interior with vehicle interior systems utilizing a deadfront article according to one or more of the embodiments discussed herein.

FIG. 2 shows a display with a deadfront with the display turned off, according to an exemplary embodiment.

FIG. 3 shows the display with deadfront of FIG. 2 with the display turned on, according to an exemplary embodiment.

DETAILED DESCRIPTION

Figure 4:
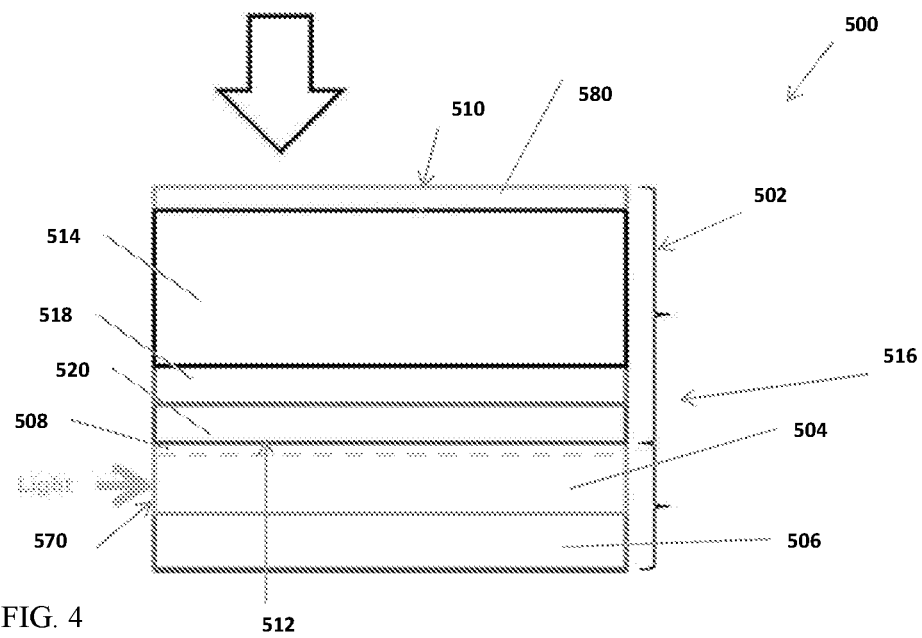
FIG. 4 is a side cross-sectional view of a deadfront article for a display utilizing a light guide, according to an exemplary embodiment.

Referring generally to the figures, vehicle interior systems may include a variety of different curved surfaces that are designed to be transparent, such as curved display surfaces, and the present disclosure provides articles and methods for forming these curved surfaces from a glass material. Forming curved vehicle surfaces from a glass material may provide a number of advantages compared to the typical curved plastic panels that are conventionally found in vehicle interiors. For example, glass is typically considered to provide enhanced functionality and user experience for many curved cover material applications, such as display applications and touch screen applications, compared to plastic cover materials.

Further, it is considered desirable in many applications to equip displays, and particularly displays for vehicle interior systems, with a deadfront structure. In general, a deadfront is a structure used in a display that blocks visibility of display components, icons, graphics, etc. when the display is off, but allows display components to be easily viewed when the display is on. In addition, a deadfront layer on a display or other glass vehicle system component can be used to match the color or pattern of the glass component to adjacent non-glass components to eliminate the visibility of transitions from the glass article to the non-glass article. For example, a display with a glass deadfront having a wood grain pattern or a leather pattern can be used to match the appearance of the display with surrounding wood or leather components of a vehicle interior system (e.g., a wood or leather dashboard) in which the display is mounted.

In specific embodiments, the present disclosure relates to the formation of a curved glass-based deadfront article for display utilizing a cold-forming or cold-bending process. As discussed herein, curved glass-based deadfront articles and processes for making the same are provided that avoid the deficiencies of the typical glass hot-forming process. For example, hot-forming processes are energy intensive and increase the cost of forming a curved glass component, relative to the cold-bending processes discussed herein. In addition, hot-forming processes typically make application of glass coating layers, such as deadfront ink or pigment layers, more difficult. For example, many ink or pigment materials cannot be applied to a flat piece of glass material prior to the hot-forming process because the ink or pigment materials typically will not survive the high temperatures of the hot-forming process. Further, application of an ink or pigment material to surfaces of a curved glass article after hot-bending is substantially more difficult then application to a flat glass article.

FIG. 1 shows a vehicle interior 10 that includes three different vehicle interior systems 100, 200, 300, according to an exemplary embodiment. Vehicle interior system 100 includes a center console base 110 with a curved surface 120 including a display, shown as curved display 130. Vehicle interior system 200 includes a dashboard base 210 with a curved surface 220 including a display, shown curved display 230. The dashboard base 210 typically includes an instrument panel 215 which may also include a curved display. Vehicle interior system 300 includes a dashboard steering wheel base 310 with a curved surface 320 and a display, shown as a curved display 330. In one or more embodiments, the vehicle interior system may include a base that is an arm rest, a pillar, a seat back, a floor board, a headrest, a door panel, or any portion of the interior of a vehicle that includes a curved surface.

The embodiments of the deadfront articles described herein can be used in any or all of vehicle interior systems 100, 200 and 300. While FIG. 1 shows an automobile interior, the various embodiments of the vehicle interior system may be incorporated into any type of vehicle such as trains, automobiles (e.g., cars, trucks, buses and the like), seacraft (boats, ships, submarines, and the like), and aircraft (e.g., drones, airplanes, jets, helicopters and the like), including both human-piloted vehicles, semi-autonomous vehicles and fully autonomous vehicles. Further, while the description herein relates primarily to the use of the deadfront embodiments used in vehicle displays, it should be understood that various deadfront embodiments discussed herein may be used in any type of display application.

Referring to FIG. 2 and FIG. 3, a deadfront 400 for a vehicle display, such as displays 130, 230 and/or 330, is shown and described. FIG. 2 shows the appearance of deadfront 400 when a light source of the associated display is inactive, and FIG. 3 shows the appearance of deadfront 400 when a light source of the associated display is active. As shown in FIG. 3, with the light source activated, a plurality of graphics or icons 410 are visible on the display. When the light source is inactivated, icons 410 disappear, and deadfront 400 presents a surface showing a desired pattern (e.g., a leather grain pattern in FIG. 2) that is unbroken by icons 410.

As will be discussed in more detail below, deadfront article 400 provides this differential icon display by utilizing one or more colored layers located between an outer glass layer and a light source. The optical properties of the colored layer are designed such that when the light source is turned off the borders of the icons or other display structures beneath the colored layer are not visible, but when the light source is on, icons 410 are visible. In various embodiments, the deadfront articles discussed herein are designed to provide a high quality deadfront, including high contrast icons with the light source on, combined with high contrast deadfront appearance when the light is off. Further, Applicant provides these various deadfront articles in a manner suitable for cold forming to curved shapes, including complex curved shapes, as discussed below.

Figure 5:
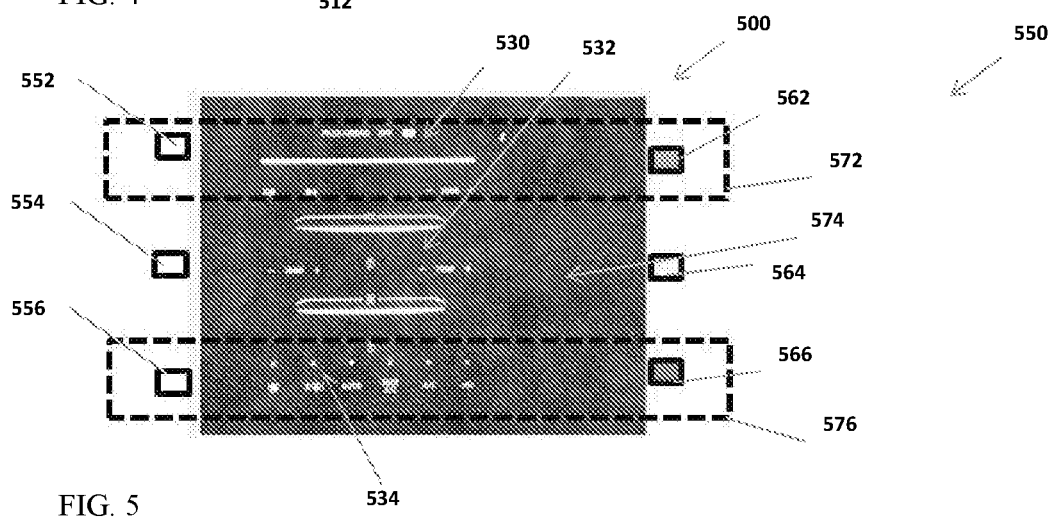
FIG. 5 shows a display utilizing the light guide based deadfront article of FIG. 4 equipped with light sources of different colors, according to an exemplary embodiment.

Referring to FIG. 4 and FIG. 5, a deadfront article 500 for a display is shown according to an exemplary embodiment. Deadfront article 500 includes a cover layer or structure, shown as cover glass stack 502, a light guide layer, shown as glass light guide layer 504, a reflector 506 and a light extraction layer 508. In general, cover glass stack 502 includes an outer surface 510, an inner surface 512, a glass layer 514 and an ink layer 516.

Glass layer 514 is located between outer surface 510 and inner surface 512, and ink layer 516 is located between inner surface 512 and glass layer 514. In one embodiment, ink layer 516 is a single layer of light transmitting ink or pigment applied to glass layer 514 to provide the deadfront functionality discussed herein. In various embodiments, such as shown in FIG. 4, ink layer 516 may include two or more layers of ink or pigment material that each have different characteristics that provide different functionality to deadfront article 500. In a specific embodiment, ink layer 516 includes a first layer 518 of light transmitting ink or pigment and a second layer 520 of light transmitting ink or pigment.

In various embodiments, first layer 518 is coupled to, attached to or bonded to an inner surface of glass layer 514, and may be applied via processes such as ink jet printing. First layer 518 may be formed from an ink material, a pigment material or any suitable layer that provides both light transmission and light blocking as discussed herein. In general, first layer 518 is a layer with differential light transmission properties that acts to block the visibility of aspects of the display below first layer 518 when a light source is inactive, but when the light source is active, first layer 518 provides sufficient light transmission to allow various display components, graphics, etc. to be viewed through first layer 518. In a specific embodiment, the transmission of the first layer 518 is between 5% and 30% for light having wavelengths of 400-700 nm.

In addition to blocking visibility of display components/icons while the display light source is inactive, a user viewing deadfront article 500 from outside of outer surface 510 is able to see first layer 518. Thus, first layer 518 may be formed to provide a desired pattern or appearance to the display incorporating deadfront article 500 while also eliminating the visibility of various display components while the light source is inactive. In various embodiments, first layer 518 is formed, colored, applied, etc. in a manner that provides a desired appearance to the display incorporating deadfront article 500. In various embodiments, first layer 518 provides one or more of the following appearances: a wood-grain design, a leather-grain design, a fabric design, a brushed metal design, a graphic design, and a logo. In other embodiments, first layer 518 may provide a solid colored appearance, such as a flat consistent black appearance.

Second layer 520 is located below first layer 518 and may be applied or printed onto the lower surface of first layer 518. In the embodiment shown, second layer 520 is an image enhancing layer of light transmitting ink or pigment located between the first layer 516 and light extraction layer 508. In a specific embodiment, layer 520 is formed from a white colored, light transmitting material that increases contrast of various portions of deadfront article 500, such as the graphics of the display (discussed below) or a pattern, design, logo, etc. provided by layer 518.

Deadfront article 500 is equipped with a glass light guide layer 504 and a light extraction layer 508 located on a surface of glass light guide layer 504. In general, in this arrangement glass light guide layer 504 and light extraction layer 508 act together to form graphics, shown as graphics 530, 532 and 534 in FIG. 5, when a display light source is activated.

In specific embodiments, glass light guide layer 504 is a sheet of glass material having inner and outer major surfaces, and in the embodiment shown in FIG. 4, light extraction layer 508 is located on the outer major surface of light guide layer 504. Light extraction layer 508 is printed or applied to the surface of light guide layer 504 in a pattern corresponding to one or more display graphics, such as graphics 530, 532 and 534 in FIG. 5.

FIG. 5 shows a display 550 equipped with deadfront article 500. As shown in FIG. 5, display 550 is equipped with one or more light sources, shown as white light sources 552, 554 and 556 and colored light sources 562, 564 and 566. In various embodiments, light sources 552, 554, 556, 562, 564 and/or 566 are LED light sources. In various embodiments, light sources 552, 554, 556, 562, 564 and/or 566 may be monochrome or multi-colored.

In general, the light sources are optically coupled to glass light guide layer 504 such that light from the light source(s) is carried within glass light guide layer 504 via total internal reflection. Light extraction layer 508 acts to extract out light from the glass light guide layer 504 in the shape of the graphics 530, 532 and 534, and because of the light transmission characteristics of ink layer 516, the shape of the extracted light is visible through cover glass stack 502 from outside of the display. This arrangement allows the user to view graphics 530, 532 and 534, when the light source(s) are activated. When the light source(s) are inactive, ink layer 516 provides the blocking function discussed herein and blocks the visibility of light extraction layer 508.

As can be seen from this description, the function of deadfront article 500 to provide visibility of graphics 530, 532 and 534 when the light sources are activated and to block visibility of display components, such as light extraction pattern that forms graphics 530, 532, and 534, stems from a balance of the light transmission properties of the various layers and materials that make up deadfront article 500. In general, light extraction layer 508 is formed from an ink material having an opacity, and the opacity of this ink material is less than a threshold that is related to a transmissivity of light through the cover glass stack 502.

In specific embodiments, the transmissivity of light through cover glass stack 502 is greater than 90% and the opacity of the ink material of light extraction layer 508 is less than 10%. In other specific embodiments, the transmissivity of light through cover glass stack 502 is between 20% and 40% and the opacity of the ink material of light extraction layer 508 is less than 75%. In other specific embodiments, the transmissivity of light through cover glass stack 502 is about 90% and the opacity of the ink material of light extraction layer 508 is about 10%. In other specific embodiments, the transmissivity of light through cover glass stack 502 is about 30% and the opacity of the ink material of light extraction layer 508 is about 75%.

In specific embodiments, the ink material of light extraction layer 508 is a white ink material having an average thickness in a range of 0.05 µm to 500 µm. In some such embodiments, the light extraction patterns of light extraction layer 508 are made of a white ink that has a reflectance that is substantially the same as the reflectance of the reflector 506. In various embodiments, light extraction layer 508 may be visible or non-visible to the eye.

In various embodiments, light extraction layer 508 is formed from clear ink material having an opacity that is nearly 0%. In this embodiment, light extraction patterns are invisible when the backlight is off, and they are visible when the backlight is on. In another embodiment, light extraction layer 508 is located on the bottom or inner surface of light guide layer 504 and light confining features are located on the top surface of light guide layer 504. In this embodiment, a first section of the graphics can be made visible in one color and a second section of the graphics can be made visible in a different color.

Suitable light extraction features can include a roughed surface on the glass sheet, produced either by roughening a surface of the glass sheet directly, or by coating the sheet with a suitable coating, for example a diffusion film. Light extraction features in some embodiments can be obtained, for example, by printing reflective (e.g., white dots) with a suitable ink, such as a UV-curable ink and drying and/or curing the ink. In some embodiments, combinations of the foregoing extraction features may be used.

In some embodiments, cover glass structure 502 has a light transmittance level less than 50%. In such embodiments, when a light source of the display is inactive, ink layer 516 is visible from outside of cover glass structure 502 and also blocks the visibility of the light extraction layer 508 from outside of cover glass structure 502. In a specific embodiment, a total level of light transmission through all layers of the cover glass stack 502 is between 5%-10% for light having wavelengths from 400 nm to 700 nm.

As shown best in FIG. 4, in some embodiments, glass light guide layer 504 is formed from a glass material that has an average thickness that is less than an average thickness of cover glass layer 514. In some embodiments, glass light guide layer 504 and cover glass layer 514 are formed from the same glass material as each other. In some other embodiments, glass light guide layer 504 is formed from a first glass material, and cover glass layer 514 is formed from a second glass material different from the first glass material. In some embodiments, an air gap may be located between glass light guide layer 504 and cover structure 502 facilitating the light guide properties of layer 504. In other embodiments, light guide layer 504 is made from a non-glass material, such as a polymer material. In a specific non-glass embodiment, light guide layer 504 is formed from a poly(methyl methacrylate) (PMMA).

Referring to FIG. 4, glass light guide layer 504 is located between reflector 506 and cover glass stack 502. In general, reflector 506 is a layer of reflective material that reflects light extracted from the backside of light guide layer 504 back into light guide layer 504 toward cover glass stack 502. In some embodiments, reflector 506 acts to increase light intensity available to display information and increases the overall display brightness of light from light guide layer 504 through cover structure 502.

By utilizing the glass light guide based as a light source for generating graphics 530, 532 and 534 as discussed above, Applicant believes that display 550 may provide a variety of advantages. In one exemplary embodiment (as shown best in FIG. 4), light guide layer 504 is formed from a sheet of glass material that includes an edge surface 570 that extends between the outer perimeters of the inner and outer major surfaces of the light guide layer 504. In such embodiments, as shown schematically in FIGS. 4 and 5, the light source(s) are optically coupled to edge surface 570. This arrangement allows the light source(s) of display 550 to be located in any of a variety of positions, eliminating the need for the light source(s) to be located in a stacked arrangement with deadfront article 500. Thus, by providing light guide layer 504, which is thin compared to many typical display stacks, like LED display stacks, the arrangement of deadfront article 500 allows for a thinner display, which may be particularly suited for location of displays on some vehicular or automotive structures that do not have sufficient depth to support a conventional display.

In some embodiments, the width and length dimensions of glass light guide layer 504 are substantially the same as the width and length dimensions of cover glass layer 514 such that glass light guide layer 504 provides a single light guide structure coextensive with the entire width and length of deadfront article 500. In other embodiments, glass light guide layer 504 has a width and/or length dimension that is less than the corresponding dimension of cover glass layer 514. In such embodiments, the glass light guide layer 504 may illuminate a sub-region of deadfront article 500.

In some such specific embodiments, deadfront article 500 may include multiple glass light guide layers 504 each illuminating a different spatially distinct region of deadfront article 500, represented by the different dashed line sections in FIG. 5. In some such embodiments, upper light guide region 572 is optically coupled to light source 562 having a first color (e.g., a blue color), central light guide region 574 is optically coupled to light source 564 having a second color (e.g., a yellow color), lower light guide region 576 is optically coupled to light source 566 having a third color (e.g., a red color). This arrangement allows each of the different spatially distinct light guide regions to be illuminated with a distinct color, allowing a wider range of information to be conveyed via display 550.

It should be understood that the glass materials or layers of deadfront article 500, such as glass layer 514 and glass light guide layer 504 may be formed from any of the glass materials discussed herein. Further, deadfront article 500 may be shaped to a curved shape via any of the shaping processes discussed herein. In various embodiments, cover structure 502 may include a functional surface layer 580, which may include at least one of a glare reduction coating, an anti-glare coating, a scratch resistance coating, an anti-reflection coating, a half-mirror coating, or easy-to-clean coating. Display 550 may also be equipped with touch sensor functionality.

Light Guide Deadfront Examples

A light guide plate was formed from Corning's trademarked Willow glass with a thickness of 200 µm. Light extraction patterns, corresponding to the desired graphics, were printed on the light guide plate with UVink LH-100 White ink available from Mimaki Global, using the Mimaki UJF7151 plus printer. The white ink was about 0.050 µm thick. Different levels of the opacity of the white ink were used.

When the opacity of the white ink was higher than a threshold, the light extraction patterns were visible even when the backlight was off. When the opacity of the white ink was lower than a threshold, the light extraction patterns were invisible when the backlight was off. The threshold of the acceptable opacity varies with the transmission of the cover stack 502. When the transmission of cover stack 502 was near 90%, the threshold of the acceptable opacity of the white ink of light extraction layer 508 was about 10%. When the transmission of cover stack 502 was about 30%, the threshold of the acceptable opacity of the white ink of light extraction layer 508 was about 75%. Further, when the white ink of light extraction layer 508 has opacity greater than the threshold, and the reflectance of the reflector 506 is substantially the same as the reflectance of the white ink of light extraction layer 508, the light extraction patterns are invisible when the backlight is off, and the light extraction patterns are visible when the backlight is on.

Curved Glass Deadfront and Cold-Forming

Referring to FIGS. 6-10, various sizes, shapes, curvatures, glass materials, etc. for a glass-based deadfront along with various processes for forming a curved glass-based deadfront are shown and described. It should be understood, that while FIGS. 6-10 are described in the context of a simplified curved deadfront structure 2000 for ease of explanation, deadfront structure 2000 may be any of the deadfront article embodiments discussed herein.

Figure 6:
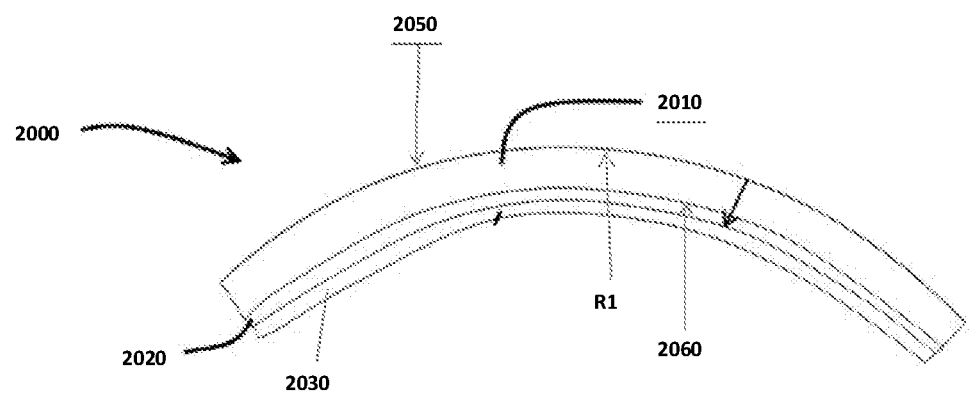
FIG. 6 is a side view of a curved glass deadfront article for use with a display, according to an exemplary embodiment.

As shown in FIG. 6, in one or more embodiments, deadfront article 2000 includes a curved outer glass layer 2010 having at least a first radius of curvature, R1, and in various embodiments, curved outer glass layer 2010 is a complex curved sheet of glass material having at least one additional radius of curvature. In various embodiments, R1 is in a range from about 60 mm to about 1500 mm.

Curved deadfront article 2000 includes a deadfront colored layer 2020 (e.g., the ink/pigment layer(s), as discussed above) located along an inner, major surface of curved outer glass layer 2010. In general, deadfront colored layer 2020 is printed, colored, shaped, etc. to provide a wood-grain design, a leather-grain design, a fabric design, a brushed metal design, a graphic design, a solid color and/or a logo. Curved deadfront article 2000 also may include any of the additional layers 2030 (e.g., high optical density layers, light guide layers, reflector layers, display module(s), display stack layers, light sources, etc.) as discussed above or that otherwise may be associated with a display or vehicle interior system as discussed herein.

As will be discussed in more detail below, in various embodiments, curved deadfront article 2000 including glass layer 2010 and colored layer 2020 may be cold-formed together to a curved shape, as shown in FIG. 6. In some embodiments, curved deadfront article 2000 including glass layer 2010, colored layer 2020 and additional layers 2030 may be cold-formed together to a curved shape, such as that shown in FIG. 6. In other embodiments, glass layer 2010 may be formed to a curved shape, and then layers 2020 and 2030 are applied following curve formation.

Figure 7:
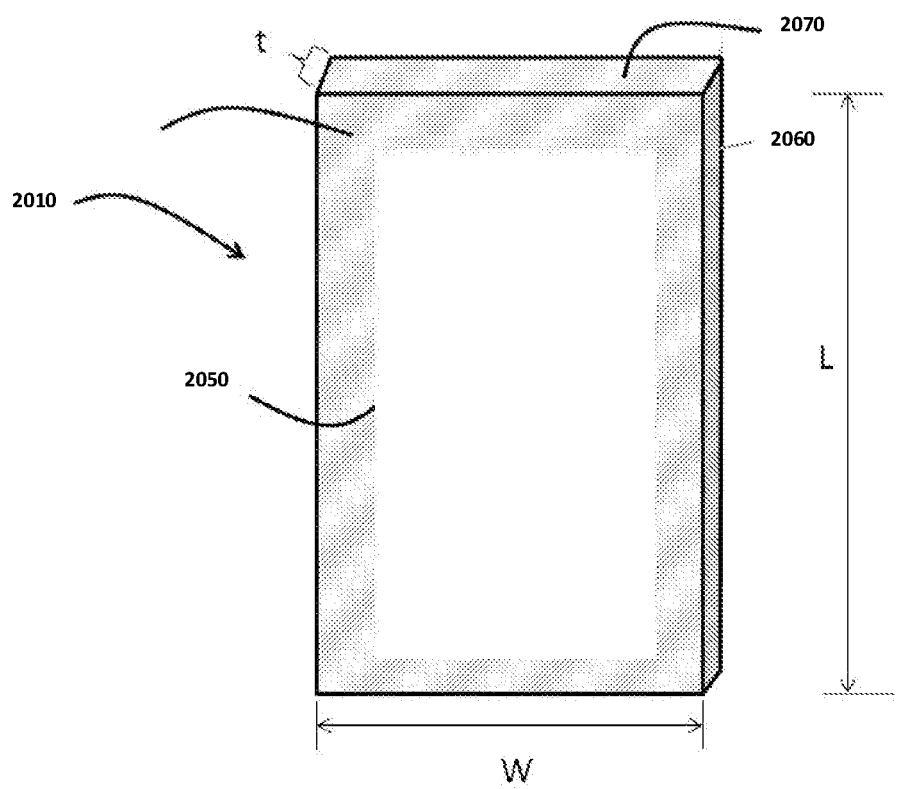
FIG. 7 is a front perspective view of a glass layer for the deadfront article of FIG. 6 prior to curve formation, according to an exemplary embodiment.

Referring to FIG. 7, outer glass layer 2010 is shown prior to being formed to the curved shape shown in FIG. 7. In general, Applicant believes that the articles and processes discussed herein provide high quality deadfront structures utilizing glass of sizes, shapes, compositions, strengths, etc. not previously provided.

As shown in FIG. 7, outer glass layer 2010 includes a first major surface 2050 and a second major surface 2060 opposite first major surface 2050. An edge surface or minor surface 2070 connects the first major surface 2050 and the second major surface 2060. Outer glass layer 2010 has a thickness (t) that is substantially constant and is defined as a distance between the first major surface 2050 and the second major surface 2060. In some embodiments, the thickness (t) as used herein refers to the maximum thickness of the outer glass layer 2010. Outer glass layer 2010 includes a width (W) defined as a first maximum dimension of one of the first or second major surfaces orthogonal to the thickness (t), and outer glass layer 2010 also includes a length (L) defined as a second maximum dimension of one of the first or second surfaces orthogonal to both the thickness and the width. In other embodiments, the dimensions discussed herein are average dimensions.

In one or more embodiments, outer glass layer 2010 has a thickness (t) that is in a range from 0.05 mm to 2 mm. In various embodiments, outer glass layer 2010 has a thickness (t) that is about 1.5 mm or less. For example, the thickness may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, outer glass layer 2010 has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, outer glass layer 2010 has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm.

As shown in FIG. 6, outer glass layer 2010 is shaped to a curved shaping having at least one radius of curvature, shown as R1. In various embodiments, outer glass layer 2010 may be shaped to the curved shape via any suitable process, including cold-forming and hot-forming.

In specific embodiments, outer glass layer 2010 is shaped to the curved shape shown in FIG. 6, either alone, or following attachment of layers 2020 and 2030, via a cold-forming process. As used herein, the terms "cold-bent," "cold-bending," "cold-formed" or "cold-forming" refers to curving the glass deadfront at a cold-form temperature which is less than the softening point of the glass (as described herein). A feature of a cold-formed glass layer is an asymmetric surface compressive between the first major surface 2050 and the second major surface 2060. In some embodiments, prior to the cold-forming process or being cold-formed, the respective compressive stresses in the first major surface 2050 and the second major surface 2060 are substantially equal.

In some such embodiments in which outer glass layer 2010 is unstrengthened, the first major surface 2050 and the second major surface 2060 exhibit no appreciable compressive stress, prior to cold-forming. In some such embodiments in which outer glass layer 2010 is strengthened (as described herein), the first major surface 2050 and the second major surface 2060 exhibit substantially equal compressive stress with respect to one another, prior to cold-forming. In one or more embodiments, after cold-forming (shown, for example, in FIG. 6) the compressive stress on the second major surface 2060 (e.g., the concave surface following bending) increases (i.e., the compressive stress on the second major surface 2050 is greater after cold-forming than before cold-forming).

Without being bound by theory, the cold-forming process increases the compressive stress of the glass article being shaped to compensate for tensile stresses imparted during bending and/or forming operations. In one or more embodiments, the cold-forming process causes the second major surface 2060 to experience compressive stresses, while the first major surface 2050 (e.g., the convex surface following bending) experiences tensile stresses. The tensile stress experienced by surface 2050 following bending results in a net decrease in surface compressive stress, such that the compressive stress in surface 2050 of a strengthened glass sheet following bending is less than the compressive stress in surface 2050 when the glass sheet is flat.

Further, when a strengthened glass sheet is utilized for outer glass layer 2010, the first major surface and the second major surface (2050, 2060) are already under compressive stress, and thus first major surface 2050 can experience greater tensile stress during bending without risking fracture. This allows for the strengthened embodiments of outer glass layer 2010 to conform to more tightly curved surfaces (e.g., shaped to have smaller R1 values).

In various embodiments, the thickness of outer glass layer 2010 is tailored to allow outer glass layer 2010 to be more flexible to achieve the desired radius of curvature. Moreover, a thinner outer glass layer 2010 may deform more readily, which could potentially compensate for shape mismatches and gaps that may be created by the shape of a support or frame (as discussed below). In one or more embodiments, a thin and strengthened outer glass layer 2010 exhibits greater flexibility especially during cold-forming. The greater flexibility of the glass articles discussed herein may allow for consistent bend formation without heating.

In various embodiments, outer glass layer 2010 (and consequently deadfront 2000) may have a compound curve including a major radius and a cross curvature. A complexly curved cold-formed outer glass layer 2010 may have a distinct radius of curvature in two independent directions. According to one or more embodiments, the complexly curved cold-formed outer glass layer 2010 may thus be characterized as having "cross curvature," where the cold-formed outer glass layer 2010 is curved along an axis (i.e., a first axis) that is parallel to a given dimension and also curved along an axis (i.e., a second axis) that is perpendicular to the same dimension. The curvature of the cold-formed outer glass layer 2010 can be even more complex when a significant minimum radius is combined with a significant cross curvature, and/or depth of bend.

Figure 8:
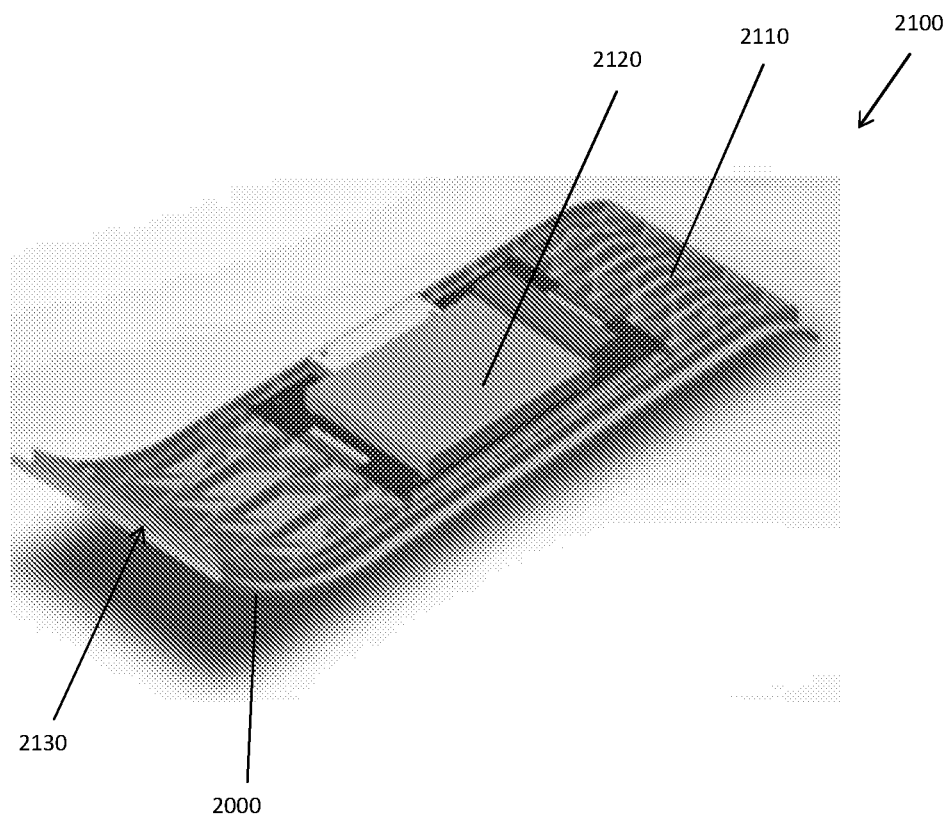
FIG. 8 shows a curved glass deadfront article shaped to conform to a curved display frame, according to an exemplary embodiment.

Referring to FIG. 8, display assembly 2100 is shown according to an exemplary embodiment. In the embodiment shown, display assembly 2100 includes frame 2110 supporting (either directly or indirectly) both a light source, shown as a display module 2120, and deadfront structure 2000. As shown in FIG. 8, deadfront structure 2000 and display module 2120 are coupled to frame 2110, and display module 2120 is positioned to allow a user to view light, images, etc. generated by display module 2120 through deadfront structure 2000. In various embodiments, frame 2110 may be formed from a variety of materials such as plastic (PC/ABS, etc.), metals (Al-alloys, Mg-alloys, Fe-alloys, etc.). Various processes such as casting, machining, stamping, injection molding, etc. may be utilized to form the curved shape of frame 2110. While FIG. 8 shows a light source in the form of a display module, it should be understood that display assembly 2100 may include any of the light sources discussed herein for producing graphics, icons, images, displays, etc. through any of the dead front embodiments discussed herein. Further, while frame 2110 is shown as a frame associated with a display assembly, frame 2110 may be any support or frame structure associated with a vehicle interior system.

In various embodiments, the systems and methods described herein allow for formation of deadfront structure 2000 to conform to a wide variety of curved shapes that frame 2110 may have. As shown in FIG. 8, frame 2110 has a support surface 2130 that has a curved shape, and deadfront structure 2000 is shaped to match the curved shape of support surface 2130. As will be understood, deadfront structure 2000 may be shaped into a wide variety of shapes to conform to a desired frame shape of a display assembly 2100, which in turn may be shaped to fit the shape of a portion of a vehicle interior system, as discussed herein.

In one or more embodiments, deadfront structure 2000 (and specifically outer glass layer 2010) is shaped to have a first radius of curvature, R1, of about 60 mm or greater. For example, R1 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, support surface 2130 has a second radius of curvature of about 60 mm or greater. For example, the second radius of curvature of support surface 2130 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, deadfront structure 2000 is cold-formed to exhibit a first radius curvature, R1, that is within 10% (e.g., about 10% or less, about 9% or less, about 8% or less, about 7% or less, about 6% or less, or about 5% or less) of the second radius of curvature of support surface 2130 of frame 2110. For example, support surface 2130 of frame 2110 exhibits a radius of curvature of 1000 mm, deadfront structure 2000 is cold-formed to have a radius of curvature in a range from about 900 mm to about 1100 mm.

In one or more embodiments, first major surface 2050 and/or second major surface 2060 of glass layer 2010 includes a surface treatment or a functional coating. The surface treatment may cover at least a portion of first major surface 2050 and/or second major surface 2060. Exemplary surface treatments include at least one of a glare reduction coating, an anti-glare coating, a scratch resistance coating, an anti-reflection coating, a half-mirror coating, or easy-to-clean coating.

Figure 9:
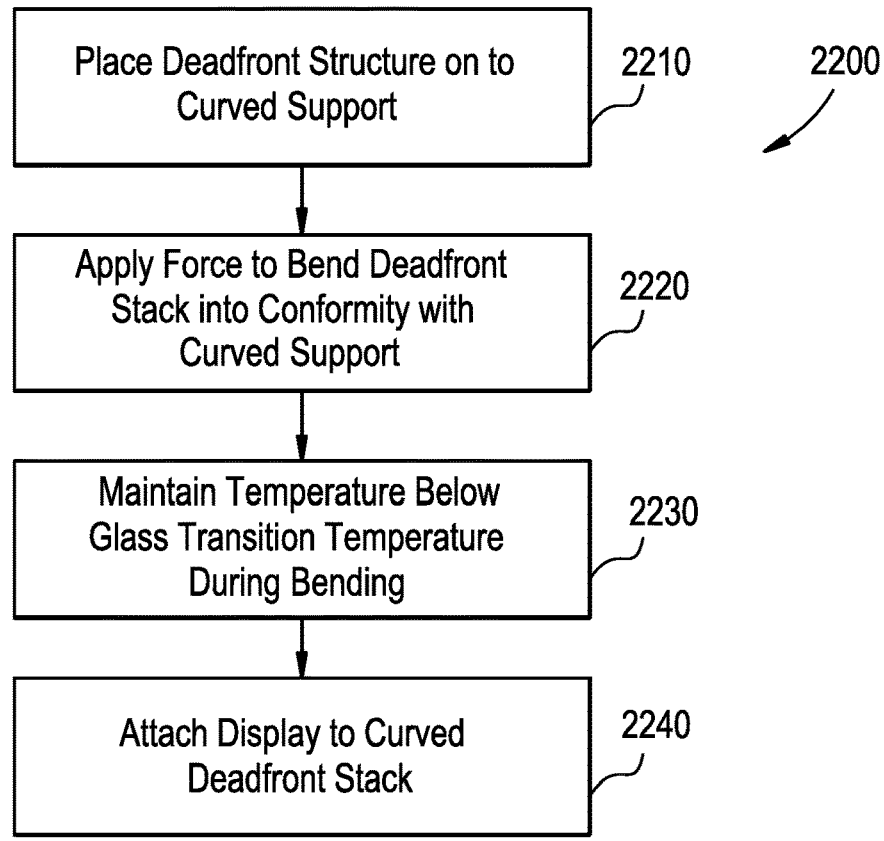
FIG. 9 shows a process for cold forming a glass deadfront article to a curved shape, according to an exemplary embodiment.

Referring to FIG. 9, a method 2200 for forming a display assembly that includes a cold-formed deadfront structure, such as deadfront structure 2000 is shown. At step 2210, a deadfront stack or structure, such deadfront structure 2000, is supported and/or placed on a curved support. In general, the curved support may be a frame of a display, such as frame 2110, that defines a perimeter and curved shape of a vehicle display. In general, the curved frame includes a curved support surface, and one of the major surfaces 2050 and 2060 of deadfront structure 2000 is placed into contact with the curved support surface.

At step 2220, a force is applied to the deadfront structure while it is supported by the support causing the deadfront structure to bend into conformity with the curved shape of the support. In this manner, a curved deadfront structure 2000, as shown in FIG. 6, is formed from a generally flat deadfront structure. In this arrangement, curving the flat deadfront structure forms a curved shape on the major surface facing the support, while also causing a corresponding (but complimentary) curve to form in the major surface opposite of the frame. Applicant believes that by bending the deadfront structure directly on the curved frame, the need for a separate curved die or mold (typically needed in other glass bending processes) is eliminated. Further, Applicant believes that by shaping the deadfront article directly to the curved frame, a wide range of curved radii may be achieved in a low complexity manufacturing process.

In some embodiments, the force applied in step 2220 may be air pressure applied via a vacuum fixture. In some other embodiments, the air pressure differential is formed by applying a vacuum to an airtight enclosure surrounding the frame and the deadfront structure. In specific embodiments, the airtight enclosure is a flexible polymer shell, such as a plastic bag or pouch. In other embodiments, the air pressure differential is formed by generating increased air pressure around the deadfront structure and the frame with an over-pressure device, such as an autoclave. Applicant has further found that air pressure provides a consistent and highly uniform bending force (as compared to a contact-based bending method) which further leads to a robust manufacturing process. In various embodiments, the air pressure differential is between 0.5 and 1.5 atmospheres of pressure (atm), specifically between 0.7 and 1.1 atm, and more specifically is 0.8 to 1 atm.

At step 2230, the temperature of the deadfront structure is maintained below the glass transition temperature of the material of the outer glass layer during the bending. As such, method 2200 is a cold-forming or cold-bending process. In particular embodiments, the temperature of the deadfront structure is maintained below 500 degrees C., 400 degrees C., 300 degrees C., 200 degrees C. or 100 degrees C. In a particular embodiment, the deadfront structure is maintained at or below room temperature during bending. In a particular embodiment, the deadfront structure is not actively heated via a heating element, furnace, oven, etc. during bending, as is the case when hot-forming glass to a curved shape.

As noted above, in addition to providing processing advantages such as eliminating expensive and/or slow heating steps, the cold-forming processes discussed herein are believed to generate curved deadfront structures with a variety of properties that are believed to be superior to those achievable via hot-forming processes. For example, Applicant believes that, for at least some glass materials, heating during hot-forming processes decreases optical properties of curved glass sheets, and thus, the curved glass based deadfront articles formed utilizing the cold-bending processes/systems discussed herein provide for both curved glass shape along with improved optical qualities not believed achievable with hot-bending processes.

Further, many glass coating materials (e.g., anti-glare coatings, anti-reflective coatings, etc.) are applied via deposition processes, such as sputtering processes, that are typically ill-suited for coating on to a curved surface. In addition, many coating materials, such as the deadfront ink/ pigment materials, also are not able to survive the high temperatures associated with hot-bending processes. Thus, in particular embodiments discussed herein, layer 2020 is applied to outer glass layer 2010 prior to cold-bending. Thus, Applicant believes that the processes and systems discussed herein allow for bending of glass after one or more coating material has been applied to the glass, in contrast to typical hot-forming processes.

At step 2240, the curved deadfront structure is attached or affixed to the curved support. In various embodiments, the attachment between the curved deadfront structure and the curved support may be accomplished via an adhesive material. Such adhesives may include any suitable optically clear adhesive for bonding the deadfront structure in place relative to the display assembly (e.g., to the frame of the display). In one example, the adhesive may include an optically clear adhesive available from 3M Corporation under the trade name 8215. The thickness of the adhesive may be in a range from about 200 μm to about 500 μm.

The adhesive material may be applied in a variety ways. In one embodiment, the adhesive is applied using an applicator gun and made uniform using a roller or a draw down die. In various embodiments, the adhesives discussed herein are structural adhesives. In particular embodiments, the structural adhesives may include an adhesive selected from one or more of the categories: (a) Toughened Epoxy (Masterbond EP21TDCHT-LO, 3M Scotch Weld Epoxy DP460 Off-white); (b) Flexible Epoxy (Masterbond EP21TDC-2LO, 3M Scotch Weld Epoxy 2216 B/A Gray); (c) Acrylic (LORD Adhesive 410/Accelerator 19 w/LORD AP 134 primer, LORD Adhesive 852/LORD Accelerator 25 GB, Loctite HF8000, Loctite AA4800); (d) Urethanes (3M Scotch Weld Urethane DP640 Brown); and (e) Silicones (Dow Corning 995). In some cases, structural glues available in sheet format (such as B-staged epoxy adhesives) may be utilized. Furthermore, pressure sensitive structural adhesives such as 3M VHB tapes may be utilized. In such embodiments, utilizing a pressure sensitive adhesive allows for the curved deadfront structure to be bonded to the frame without the need for a curing step.

In one or more embodiments, the method includes disposing or assembling the curved display in a vehicle interior system 100, 200, 300.

Figure 10:
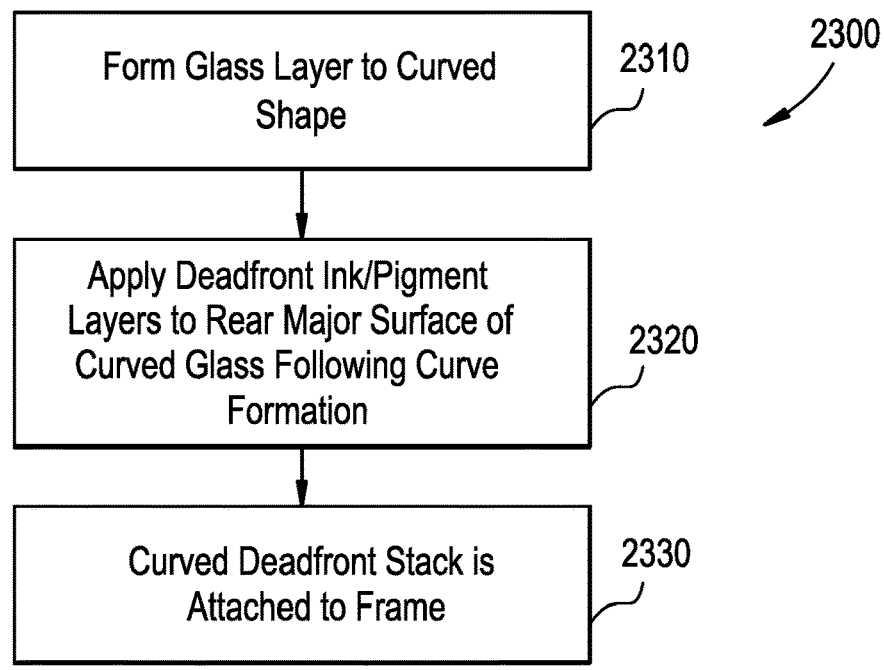
FIG. 10 shows a process for forming a curved glass deadfront article utilizing a curved glass layer, according to an exemplary embodiment.

Referring to FIG. 10, method 2300 for forming a display utilizing a curved deadfront structure is shown and described. In some embodiments, the glass layer (e.g., outer glass layer 2010) of a deadfront structure is formed to a curved shape at step 2310. Shaping at step 2310 may be either cold-forming or hot-forming. At step 2320, the deadfront ink/pigment layer(s) (e.g., layer 2020) is applied to the glass layer following shaping. Next at step 2330, the curved deadfront structure is attached to a frame, such as frame 2110 of display assembly 2100, or other frame that may be associated with a vehicle interior system.

Glass Materials

The various glass layer(s) of the deadfront structures discussed herein, such as outer glass layer 2010, may be formed from any suitable glass composition including soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, glass layer(s) herein are described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$, about 1 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass compositon includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Strengthened Glass Properties

In one or more embodiments, outer glass layer 2010 or other glass layer of any of the deadfront article embodiments discussed herein may be formed from a strengthened glass sheet or article. In one or more embodiments, the glass articles used to form the layer(s) of the deadfront structures discussed herein may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass articles used to form the layer(s) of the deadfront structures discussed herein may be strengthened mechanically by utilizing a mismatch of the coefficient of thermal expansion between portions of the glass to create a compressive stress region and a central region exhibiting a tensile stress. In some embodiments, the glass article may be strengthened thermally by heating the glass to a temperature above the glass transition point and then rapidly quenching.

In one or more embodiments, the glass articles used to form the layer(s) of the deadfront structures discussed herein may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass article generate a stress.

Ion exchange processes are typically carried out by immersing a glass article in a molten salt bath (or two or more molten salt baths) containing the larger ions to be exchanged with the smaller ions in the glass article. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass layer(s) of a deadfront structure (including the structure of the article and any crystalline phases present) and the desired DOC and CS of the glass layer(s) of a deadfront structure that results from strengthening.

Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on the glass thickness, bath temperature and glass (or monovalent ion) diffusivity. However, temperatures and immersion times different from those described above may also be used.

In one or more embodiments, the glass articles used to form the layer(s) of the deadfront structures may be immersed in a molten salt bath of 100% $NaNO_3$, 100% $KNO_3$, or a combination of $NaNO_3$ and $KNO_3$ having a temperature from about 370° C. to about 480° C. In some embodiments, the glass layer(s) of a deadfront structure may be immersed in a molten mixed salt bath including from about 5% to about 90% $KNO_3$ and from about 10% to about 95% $NaNO_3$. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass articles used to form the layer(s) of the deadfront structures may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass layer(s) of a deadfront structure. The spike may result in a greater surface CS value. This spike can be achieved by single bath or multiple baths, with the bath(s) having a single composition or mixed composition, due to the unique properties of the glass compositions used in the glass layer(s) of a deadfront structure described herein.

In one or more embodiments, where more than one monovalent ion is exchanged into the glass articles used to form the layer(s) of the deadfront structures, the different monovalent ions may exchange to different depths within the glass layer (and generate different magnitudes stresses within the glass article at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass article. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass article is chemically strengthened by an ion exchange treatment, FSM or SCALP may be used depending on which ion is exchanged into the glass article. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Central tension or CT is the maximum tensile stress and is measured by SCALP.

In one or more embodiments, the glass articles used to form the layer(s) of the deadfront structures maybe strengthened to exhibit a DOC that is described a fraction of the thickness t of the glass article (as described herein). For example, in one or more embodiments, the DOC may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, The DOC may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm.

In one or more embodiments, the glass articles used to form the layer(s) of the deadfront structures may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the glass articles used to form the layer(s) of the deadfront structures may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

Aspect (1) of this disclosure pertains to a deadfront article for a display comprising: a cover structure comprising: an inner surface, an outer surface opposite the inner surface, a glass layer located between the inner surface and the outer surface, and a first layer of light transmitting ink or pigment located between the inner surface of the cover structure and the glass layer; a light guide layer comprising: an inner surface, and an outer surface facing toward the inner surface of the cover structure; and a light extraction layer located on at least one of the inner surface and the outer surface of the light guide layer.

Aspect (2) of this disclosure pertains to the deadfront article of Aspect (1), wherein the light extraction layer forms a pattern corresponding to a display graphic.

Aspect (3) of this disclosure pertains to the deadfront article of Aspect (1) or (2), wherein the light extraction layer is formed from an ink material having an opacity, where the opacity of the ink material is less than a threshold that is related to a transmissivity of light through the cover structure layer.

Aspect (4) of this disclosure pertains to the deadfront article of Aspect (3), wherein the transmissivity of light through the cover structure is greater than 90% and the opacity of the ink material of the light extraction layer is less than 10%.

Aspect (5) of this disclosure pertains to the deadfront article of Aspect (3), wherein the transmissivity of light through the cover structure is about 90% and the opacity of the ink material of the light extraction layer is about 10%.

Aspect (6) of this disclosure pertains to the deadfront article of Aspect (3), wherein the transmissivity of the cover structure is between 20% and 40% and the opacity of the ink material of the light extraction layer is less than 75%.

Aspect (7) of this disclosure pertains to the deadfront article of Aspect (3), wherein the transmissivity of light through the cover structure is about 30% and the opacity of the ink material of the light extraction layer is about 75%.

Aspect (8) of this disclosure pertains to the deadfront article of Aspect (3), wherein the ink material is a white ink material having an average thickness in a range of 0.05 μm to 500 μm.

Aspect (9) of this disclosure pertains to the deadfront article of any one of Aspects (1) through (8), wherein the cover structure has a light transmittance level less than 50% such that when a light source of the display is inactive the first layer of light transmitting ink or pigment is visible from outside of the cover structure and blocks the visibility of the light extraction layer from outside of the cover structure.

Aspect (10) of this disclosure pertains to the deadfront article of any one of Aspects (1) through (9), wherein the first layer of light transmitting ink or pigment comprises any one of a wood-grain design, a leather-grain design, a fabric design, a brushed metal design, a graphic design, and a logo.

Aspect (11) of this disclosure pertains to the deadfront article of any one of Aspects (1) through (10), wherein the cover structure further comprises an image enhancing layer of light transmitting ink or pigment located between the first layer of light transmitting ink or pigment and the light extraction layer.

Aspect (12) of this disclosure pertains to the deadfront article of any one of Aspects (1) through (11), wherein a total level of light transmission through all layers of the cover glass layer is between 5%-10% for light having wavelengths from 400 nm to 700 nm.

Aspect (13) of this disclosure pertains to the deadfront article of any one of Aspects (1) through (12), wherein the glass layer of the cover structure comprises an average thickness between the inner and outer surfaces in a range from 0.05 mm to 2 mm.

Aspect (14) of this disclosure pertains to the deadfront article of any one of Aspects (1) through (13), wherein an average thickness between the inner and outer surfaces of the light guide layer is less than an average thickness of the glass layer of the cover structure.

Aspect (15) of this disclosure pertains to the deadfront article of any one of Aspects (1) through (14), wherein the glass layer of the cover structure is formed from a strengthened glass material, and the light guide layer is formed from at least one of a glass material and a polymer material.

Aspect (16) of this disclosure pertains to the deadfront article of any one of Aspects (1) through (15), wherein the cover structure is curved comprising a first radius of curvature.

Aspect (17) of this disclosure pertains to the deadfront article of Aspect (16), wherein the first radius of curvature is in a range from about 60 mm to about 1500 mm.

Aspect (18) of this disclosure pertains to the deadfront article of Aspects (16) or (17), wherein the cover structure comprises a second radius of curvature different from the first radius of curvature.

Aspect (19) of this disclosure pertains to the deadfront article of Aspect (18), wherein the first radius of curvature and the second radius of curvature have different axes of curvature.

Aspect (20) of this disclosure pertains to the deadfront article of any one of Aspects (16) through (19), wherein the cover structure is cold-formed to the curved shape.

Aspect (21) of this disclosure pertains to the deadfront article of any one of Aspects (1) through (20), wherein a maximum thickness of the glass layer of the cover structure is less than or equal to 1.5 mm.

Aspect (22) of this disclosure pertains to the deadfront article of any one of Aspects (1) through (21), wherein a maximum thickness of the glass layer of the cover structure is 0.3 mm to 0.7 mm.

Aspect (23) of this disclosure pertains to the deadfront article of any one of Aspects (1) through (22), wherein the cover structure has a width and a length, wherein the width is in a range from about 5 cm to about 250 cm, and the length is from about 5 cm to about 250 cm.

Aspect (24) of this disclosure pertains to the deadfront article of any one of Aspects (1) through (23), further comprising a reflector positioned such that the light guide layer is located between the reflector and the cover structure.

Aspect (25) of this disclosure pertains to a vehicle interior system comprising: a cover glass layer; a glass light guide layer located below the cover glass layer; a light extraction layer located on a surface of the glass light guide layer, wherein the light extraction layer forms a pattern corresponding to a display graphic; and a first light source optically coupled to the glass light guide layer such that light from the first light source is carried within the glass light guide layer via total internal reflection; wherein, when the first light source is activated, the light within the glass light guide layer is extracted out by the light extraction layer in the shape of the display graphic which is visible through the cover glass layer.

Aspect (26) of this disclosure pertains to the vehicle interior system of Aspect (25), wherein the pattern formed by the light extraction layer is not visible through the cover glass layer when the first light source is inactive.

Aspect (27) of this disclosure pertains to the vehicle interior system of Aspects (25) or (26), wherein the glass light guide layer comprises: an inner major surface; an outer major surface; and an edge surface extending between outer perimeters of the inner major surface and the outer major surface; wherein the first light source is optically coupled to the edge surface of the glass light guide layer.

Aspect (28) of this disclosure pertains to the vehicle interior system of any one of Aspects (25) through (27), further comprising a second light source optically coupled to the glass light guide layer such that light from the second light source is carried within the glass light guide layer via total internal reflection, wherein the first light source has a first color and the second light source has a second color different from the first color.

Aspect (29) of this disclosure pertains to the vehicle interior system of any one of Aspects (25) through (28), further comprising a plurality of additional light sources optically coupled to the glass light guide layer, each of the plurality of additional light sources having a distinct color, wherein the glass light guide layer is configured to display each of the distinct colors at a spatially distinct region of the cover glass layer.

Aspect (30) of this disclosure pertains to the vehicle interior system of any one of Aspects (25) through (29), wherein the cover glass layer comprises a first layer of light transmitting ink or pigment located between the cover glass layer and the glass light guide layer.

Aspect (31) of this disclosure pertains to the vehicle interior system of Aspect (30), wherein the first layer of light transmitting ink or pigment has a light transmittance level less than 50% such that when the first light source is inactive the first layer of light transmitting ink or pigment is visible from outside of the cover glass layer and blocks the visibility of the light extraction layer from outside of the cover glass layer.

Aspect (32) of this disclosure pertains to the vehicle interior system of Aspect (30) or (31), wherein the first layer of light transmitting ink or pigment comprises any one of a wood-grain design, a leather-grain design, a fabric design, a brushed metal design, a graphic design, and a logo.

Aspect (33) of this disclosure pertains to the vehicle interior system of any one of Aspects (25) through (32), wherein the cover glass layer is formed from a strengthened glass material and comprises an average thickness between inner and outer major surfaces in a range from 0.05 mm to 2 mm.

Aspect (34) of this disclosure pertains to the vehicle interior system of any one of Aspects (25) through (33), wherein the cover glass layer comprises a radius of curvature of between 60 mm and 1500 mm along at least one of the inner surface and the outer surface.

Aspect (35) of this disclosure pertains to the vehicle interior system of any one of Aspects (25) through (34), further comprising a reflector positioned such that the glass light guide layer is located between the reflector and the cover glass layer;

Aspect (36) of this disclosure pertains to a method of forming a curved deadfront for a display comprising: supporting a deadfront article on a support having a curved surface, wherein the deadfront article comprises: a cover glass layer, a light guide layer located below the cover glass layer, and a light extraction layer located on a surface of the light guide layer, wherein the light extraction layer forms a pattern corresponding to a display graphic; and applying a force to the deadfront article while supported by the support causing the deadfront article to bend such that the deadfront article conforms to the curved shape of the curved surface of the support; wherein during application of the force, a maximum temperature of the deadfront article is less than a glass transition temperature of the cover glass layer.

Aspect (37) of this disclosure pertains to the method of Aspect (36), further comprising: applying an adhesive between the curved surface of the support and a surface of the deadfront article; and bonding the deadfront article to the support surface of the frame with the adhesive during application of the force.

Aspect (38) of this disclosure pertains to the method of Aspect (36) or (37), wherein the cover glass layer is at least one of chemically strengthened and thermally strengthened, and the light guide layer is formed from at least one of a glass material and a polymer material.

Aspect (39) of this disclosure pertains to the method of any one of Aspects (36) through (38), wherein the cover glass layer comprises first and second opposing major surfaces, wherein a maximum thickness of the cover glass layer measured between the first and second major surfaces is less than or equal to 1.5 mm.

Aspect (40) of this disclosure pertains to the method of any one of Aspects (36) through (39), wherein during application of the force, a maximum temperature of the deadfront article is less than 200 degrees C.

Aspect (41) of this disclosure pertains to the method of any one of Aspects (36) through (40), further comprising a reflector positioned such that the light guide layer is located between the reflector and the glass layer;

Aspect (42) of this disclosure pertains to the method of any one of Aspect (36) through (41), further comprising optically coupling a light source to the light guide layer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A deadfront article for a display comprising:
   a cover structure comprising:
      an inner surface;
      an outer surface opposite the inner surface;
      a glass layer located between the inner surface and the outer surface; and
      a first layer of light transmitting ink or pigment located between the inner surface of the cover structure and the glass layer;
   a light guide layer comprising:
      an inner surface; and
      an outer surface facing toward the inner surface of the cover structure; and
   a light extraction layer located on at least one of the inner surface and the outer surface of the light guide layer, wherein:
   the first layer of light transmitting ink or pigment is configured to provide a colored or patterned appearance to the deadfront article from the outer surface when light from a light source is not provided to the light extraction layer, and
   the first layer of light transmitting ink or pigment is configured to allow viewing of the light from the outer surface when the light is extracted from the light guide layer by the light extraction layer.

2. The deadfront article of claim 1, wherein the light extraction layer is formed from an ink material having an opacity, where the opacity of the ink material is less than a threshold that is related to a transmissivity of light through the cover structure layer.

3. The deadfront article of claim 2, wherein the transmissivity of light through the cover structure is greater than 90% and the opacity of the ink material of the light extraction layer is less than 10%.

4. The deadfront article of claim 2, wherein the transmissivity of light through the cover structure is 90% and the opacity of the ink material of the light extraction layer is 10%.

5. The deadfront article of claim 2, wherein the transmissivity of the cover structure is between 20% and 40% and the opacity of the ink material of the light extraction layer is less than 75%.

6. The deadfront article of claim 2, wherein the ink material is a white ink material having an average thickness in a range of 0.05 μm to 500 μm.

7. The deadfront article of claim 1, wherein the cover structure has a light transmittance level less than 50% such that when a light source of the display is inactive the first layer of light transmitting ink or pigment is visible from outside of the cover structure and blocks the visibility of the light extraction layer from outside of the cover structure.

8. The deadfront article of claim 1, wherein a total level of light transmission through all layers of the glass layer is between 5%-10% for light having wavelengths from 400 nm to 700 nm.

9. The deadfront article of claim 1, wherein the glass layer of the cover structure comprises an average thickness between the inner and outer surfaces in a range from 0.05 mm to 2 mm.

10. The deadfront article of claim 1, wherein an average thickness between the inner and outer surfaces of the light guide layer is less than an average thickness of the glass layer of the cover structure.

11. The deadfront article of claim 1, wherein the glass layer of the cover structure is formed from a strengthened glass material, and the light guide layer is formed from at least one of a glass material and a polymer material.

12. The deadfront article of claim 1, wherein the cover structure is curved comprising a first radius of curvature.

13. The deadfront article of claim 1, wherein the cover structure is cold-formed to the curved shape.

14. The vehicle interior system of claim 1, wherein the cover glass layer comprises a first layer of light transmitting ink or pigment located between the cover glass layer and the glass light guide layer.

15. The vehicle interior system of claim 14, wherein the first layer of light transmitting ink or pigment has a light transmittance level less than 50% such that when the first light source is inactive the first layer of light transmitting ink or pigment is visible from outside of the cover glass layer and blocks the visibility of the light extraction layer from outside of the cover glass layer.

16. A vehicle interior system comprising:
a cover glass layer;
a glass light guide layer located below the cover glass layer;
a light extraction layer located on a surface of the glass light guide layer, wherein the light extraction layer forms a pattern corresponding to a display graphic; and
a first light source optically coupled to the glass light guide layer such that light from the first light source is carried within the glass light guide layer via total internal reflection;
wherein, when the first light source is activated, the light within the glass light guide layer is extracted out by the light extraction layer in the shape of the display graphic which is visible through the cover glass layer.

17. The vehicle interior system of claim 16, wherein the pattern formed by the light extraction layer is not visible through the cover glass layer when the first light source is inactive.

18. The vehicle interior system of claim 16, wherein the glass light guide layer comprises:
an inner major surface;
an outer major surface; and
an edge surface extending between outer perimeters of the inner major surface and the outer major surface;
wherein the first light source is optically coupled to the edge surface of the glass light guide layer.

19. The vehicle interior system of claim 16, further comprising a second light source optically coupled to the glass light guide layer such that light from the second light source is carried within the glass light guide layer via total internal reflection, wherein the first light source has a first color and the second light source has a second color different from the first color.

* * * * *

UNITED STATES PATENT AND TRADEMARK OFFICE
CERTIFICATE OF CORRECTION

| | |
|---|---|
| PATENT NO. | : 11,772,491 B2 |
| APPLICATION NO. | : 16/646756 |
| DATED | : October 3, 2023 |
| INVENTOR(S) | : Antoine D. Lesuffleur et al. |

It is certified that error appears in the above-identified patent and that said Letters Patent is hereby corrected as shown below:

On the Title Page

On the page 5, in Column 2, item (56), under "Other Publications", Line 20, delete "atglasstec," and insert -- at glasstec, --.

On the page 5, in Column 2, item (56), under "Other Publications", Line 25, delete "Fauercia" and insert -- Faurecia --.

On the page 6, in Column 1, item (56), under "Other Publications", Line 8, delete "Autointerior" and insert -- Auto interior --.

On the page 6, in Column 1, item (56), under "Other Publications", Line 14, delete ""Pegaton" and insert -- "Pegatron --.

On the page 6, in Column 1, item (56), under "Other Publications", Line 15, delete "Cnsole" and insert -- Console --.

On the page 6, in Column 2, item (56), under "Other Publications", Line 29, delete "Internaitonal" and insert -- International --.

On the page 6, in Column 2, item (56), under "Other Publications", Line 34, delete "Faade" and insert -- Facade --.

On the page 6, in Column 2, item (56), under "Other Publications", Line 35, delete "Faade"," and insert -- Facade", --.

Signed and Sealed this
Twenty-sixth Day of November, 2024

Katherine Kelly Vidal
*Director of the United States Patent and Trademark Office*